US010581106B2

(12) United States Patent
Brown

(10) Patent No.: US 10,581,106 B2
(45) Date of Patent: Mar. 3, 2020

(54) INTERCONNECT FOR AN INTERNALLY-MANIFOLDED SOLID OXIDE FUEL CELL STACK; AND RELATED METHODS AND POWER SYSTEMS

(71) Applicant: CUMMINS ENTERPRISE LLC, Indianapolis, IN (US)

(72) Inventor: Keith Garrette Brown, Clifton Park, NY (US)

(73) Assignee: Cummins Enterprise LLC, Indianapolis, IN (US)

( * ) Notice: Subject to any disclaimer, the term of this patent is extended or adjusted under 35 U.S.C. 154(b) by 158 days.

(21) Appl. No.: 15/281,740

(22) Filed: Sep. 30, 2016

(65) Prior Publication Data

US 2018/0097250 A1 Apr. 5, 2018

(51) Int. Cl.
*H01M 8/2483* (2016.01)
*H01M 8/2432* (2016.01)
*H01M 8/0258* (2016.01)
*H01M 8/0612* (2016.01)
*H01M 8/1213* (2016.01)
(Continued)

(52) U.S. Cl.
CPC ....... *H01M 8/2483* (2016.02); *H01M 8/0258* (2013.01); *H01M 8/0618* (2013.01); *H01M 8/1213* (2013.01); *H01M 8/2425* (2013.01); *H01M 8/2432* (2016.02); *H01M 8/0232* (2013.01); *H01M 2008/1293* (2013.01); *H01M 2300/0074* (2013.01)

(58) Field of Classification Search
CPC ............ H01M 8/2483; H01M 8/2432; H01M 8/0258; H01M 8/0618; H01M 8/1213; H01M 8/2425

USPC .................................. 429/425, 457, 514
See application file for complete search history.

(56) References Cited

U.S. PATENT DOCUMENTS

| 5,376,472 A | 12/1994 | Hartvigsen et al. |
| 6,296,962 B1 | 10/2001 | Minh |

(Continued)

FOREIGN PATENT DOCUMENTS

| FR | 3016084 A1 * | 7/2015 | .......... H01M 8/0247 |
| JP | 2006221896 A * | 8/2006 | |
| JP | 2008027750 A * | 2/2008 | |

OTHER PUBLICATIONS

K P Recknagle et al., "Three-dimensional thermo-fluid electrochemical modeling of planar SOFC stacks", Journal of Power Sources, vol. 113, Issue: 1, pp. 109-114, Jan. 1, 2003.

(Continued)

*Primary Examiner* — Sean P Cullen
(74) *Attorney, Agent, or Firm* — Barnes & Thornburg LLP

(57) ABSTRACT

An internally-manifolded solid oxide fuel cell (SOFC) stack is described, including an anode interconnect structure integrated with a cathode interconnect structure. The anode interconnect structure includes a fuel flow field; and the cathode interconnect structure includes an air flow field. The two structures are configured to allow for parallel flow of air and fuel across a plane of the interconnect, while the manifold openings for the fuel are arranged in a cross-flow orientation across a plane of the interconnect structure. Related processes are also described, along with a power generation system that includes an SOFC incorporating this type of interconnect, attached directly or indirectly to at least one power block, such as a combustion engine.

8 Claims, 6 Drawing Sheets

(51) Int. Cl.
*H01M 8/2425* (2016.01)
*H01M 8/0232* (2016.01)
*H01M 8/124* (2016.01)

(56) References Cited

U.S. PATENT DOCUMENTS

| | | | |
|---|---|---|---|
| 6,492,053 | B1 | 12/2002 | Donelson et al. |
| 6,803,136 | B2 | 10/2004 | Ong et al. |
| 6,824,910 | B2 | 11/2004 | Chung et al. |
| 8,097,384 | B2 | 1/2012 | Zafred et al. |
| 9,093,674 | B2 | 7/2015 | Barnard et al. |
| 2002/0055028 | A1 | 5/2002 | Ghosh et al. |
| 2005/0221151 | A1* | 10/2005 | Suzuki ............... H01M 8/0247 429/434 |
| 2006/0127706 | A1 | 6/2006 | Goebel et al. |
| 2009/0202878 | A1 | 8/2009 | Schild |
| 2011/0229789 | A1* | 9/2011 | Dekker ............... H01M 8/0254 429/457 |
| 2012/0251898 | A1 | 10/2012 | Lehar et al. |
| 2012/0251899 | A1 | 10/2012 | Lehar et al. |
| 2013/0260268 | A1 | 10/2013 | Shapiro et al. |

OTHER PUBLICATIONS

Liu et al, "Quantitative analysis of temperature distribution in cross-flow planar SOFC based on a validated model", Chinese Automation Congress (CAC), 2015, pp. 1192-1196, Nov. 27-29, 2015, Wuhan.

Jewulski, J. et al., "Flow Distribution Analysis of the Solid Oxide Fuel Cell Stack under Electrical Load Conditions," Session B07—SOFC: Cells and Components 3, pp. 1-14, (2009).

Yang, Z. "Recent Advances in Metallic Interconnects for Solid Oxide Fuel Cells," International Materials Reviews, vol. 53, Issue 1, pp. 39-54, (2008) (Abstract).

Extended European Search Report and Opinion issued in connection with corresponding EP Application No. 17190671.2 dated Nov. 29, 2017.

* cited by examiner

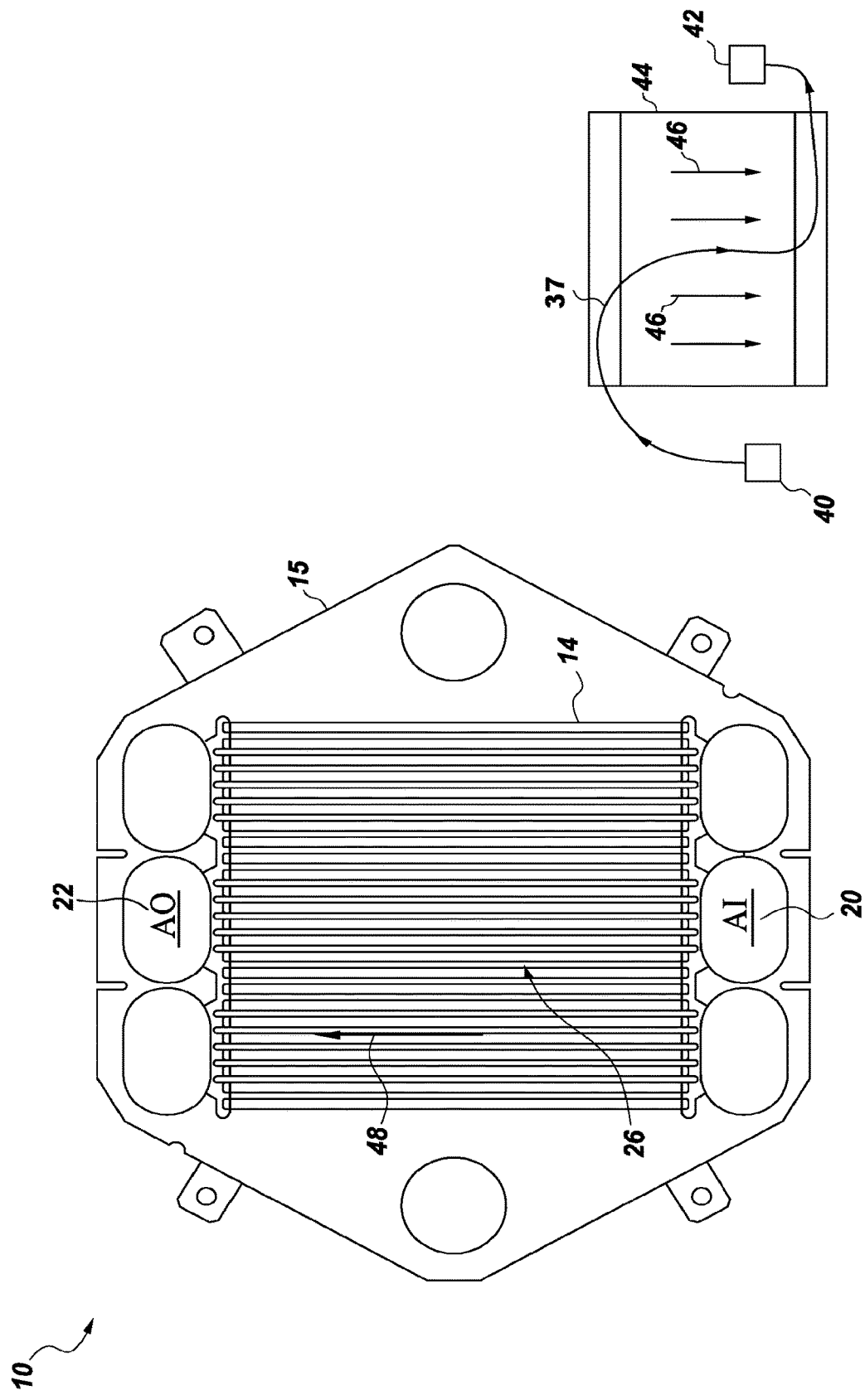

US 10,581,106 B2

INTERCONNECT FOR AN INTERNALLY-MANIFOLDED SOLID OXIDE FUEL CELL STACK; AND RELATED METHODS AND POWER SYSTEMS

TECHNICAL FIELD

This disclosure relates generally to the field of solid oxide fuel cells. In some specific embodiments, the invention relates to interconnects that influence the flow of air and fuel across active areas in the fuel cells.

BACKGROUND

Solid oxide fuel cells (SOFC's), like other fuel cells, are energy conversion devices that produce electricity by electrochemically combining a fuel and an oxidant across an ionic conducting layer. Desirably, power generation systems incorporating high-temperature fuel cells have the potential for higher efficiencies and power outputs. Exemplary high-temperature fuel cells have operating temperatures above about 600° C.; and SOFC's typically operate in a range between about 600° C. and 850 C. A fuel cell produces electricity by catalyzing fuel and oxidant into ionized atomic hydrogen and oxygen at, respectively, the anode and cathode. The electrons removed from hydrogen in the ionization process at the anode are conducted to the cathode where they ionize the oxygen.

In the case of a solid oxide fuel cell, the oxygen ions are conducted through the electrolyte where they combine with ionized hydrogen to form water as a waste product and complete the process. The electrolyte is otherwise impermeable to both fuel and oxidant, and merely conducts oxygen ions. This series of electrochemical reactions is the sole means of generating electric power within the fuel cell. It is therefore desirable to reduce or eliminate any mixing of the reactants. Otherwise, a different result might occur, such as combustion, which does not produce electric power, and therefore reduces the efficiency of the fuel cell.

A typical fuel cell operates at a potential of less than about one (1) Volt. To achieve sufficient voltages for power generation applications, a number of individual fuel cells are integrated into a larger component. To create a fuel stack, an interconnecting member or "interconnect" is used to connect the adjacent fuel cells together in an electrical series, in such a way that the fuel and oxidants of the adjacent cells do not mix together. Interconnects play a crucial role in an SOFC stack. They must exhibit excellent electrical conductivity, as well as strength and thermal and dimensional stability at elevated temperatures. The interconnects should also be impervious to oxygen and hydrogen, so as to prevent their contact during cell operation. They should also be relatively easy to fabricate, according to configurations that allow for efficient cell assembly, as well as the flow of air and fuel through the cell.

SOFC stacks for planar cells very often rely on internal manifold channels for the transport of fuel and air to the active region of the cells, via one or more interconnects. The pathway and distribution of these gaseous reactants within the manifolds and interconnects has been the subject of a great deal of research over many years, since it has such a critical effect on stack operation. Reference is made, for example, to "Flow Distribution Analysis of the Solid Oxide Fuel Cell Stack under Electrical Load Conditions, J. Jewulski et al, B07-SOFC; Cells and Components 3, 2009. In addition to ensuring proper gas flow through the channels in the cell, the interconnect structure must effectively provide seals around the manifold openings—seals that can withstand high-temperature operation of the cell.

In a typical SOFC interconnect design, a parallel-flow of fuel and air (often a counter-flow arrangement) is preferred for optimum performance of the fuel cell, due in part to the large amount of heat arising from fuel reformation and energy production. However, a counter-flow arrangement usually requires that fuel and air ports (manifold openings) be next to each other. Their adjacent location can, in some cases, undesirably reduce access of the manifold to the flow area of the cell, and can also increase the possibility of fuel-to-air leaks.

In contrast, a cross-flow design, i.e., where fuel flow and airflow intersect at 90°, is often advantageous, in that the manifold openings can be spaced from each other, e.g., on opposing sides of a planar interconnect. This allows for ease-of-manufacture, and minimizing the possibility of premature contact between air and fuel. However, the cross-flow design is sometimes disadvantageous for other reasons, such as the tendency to develop large temperature gradients during fuel cell operation.

With these general considerations in mind, improved interconnects for solid oxide fuel cells would be welcome in the art. Interconnect configurations that enhance the flow of fuel and air through the fuel cell structure would be especially desirable, perhaps combining the advantages of cross-flow design and counter-flow (parallel) designs. The interconnects should also be capable of providing sealing structures around any manifold opening or other passageway where air- and fuel flow must be tightly controlled or prevented. Furthermore, the interconnects should be relatively easy to fabricate, and to assemble into a full SOFC power stack on an industrial scale.

BRIEF DESCRIPTION OF THE INVENTION

One embodiment of the invention is directed to an interconnect for an internally-manifolded solid oxide fuel cell (SOFC) stack, comprising at least one anode interconnect structure integrated with and adjacent to a cathode interconnect structure. The anode interconnect structure includes a fuel flow field; and the cathode interconnect structure includes an air flow field. The two structures are configured to allow for parallel flow of air and fuel across a plane of the interconnect, while the manifold openings for both the anode interconnect structure and the cathode interconnect structure are arranged in a cross-flow orientation.

Another embodiment is directed to a method for providing parallel flow of air and fuel across a planar interconnect surface for an internally-manifolded SOFC stack in which fuel manifold openings on the interconnect surface are arranged in cross-flow orientation. This method comprises the step of directing the flow of fuel through fuel-routing pathways in a manifold plate structure interposed between an anode interconnect and a cathode interconnect. The fuel-routing pathways are configured to re-direct the flow of fuel from a cross-flow orientation to a parallel flow orientation, relative to the flow of air across the planar interconnect surface.

Still another embodiment of the invention relates to a power generation system, comprising a solid oxide fuel cell (SOFC) attached directly or indirectly to at least one power block. As further described below, the SOFC includes at least one anode interconnect structure, integrated with and adjacent to a cathode interconnect structure. The anode interconnect structure includes a fuel flow field; and the cathode interconnect structure includes an air flow field. The two structures are configured to allow for parallel flow of air and fuel across a plane of the interconnect. The manifold openings for both the anode interconnect structure and the cathode interconnect structure are arranged in a cross-flow orientation.

These and other details and features of the various inventive embodiments will become apparent from the following detailed description, taken in conjunction with the drawings.

BRIEF DESCRIPTION OF THE DRAWINGS

FIG. 2 is a schematic of another portion of a fuel cell interconnect structure for this invention, showing an airflow field.

FIG. 3 is a simplified illustration of a fuel flow path for a fuel cell interconnect structure, according to some inventive embodiments.

DETAILED DESCRIPTION OF THE INVENTION

It should be noted that when introducing elements of various embodiments of the present invention, the articles "a," "an," "the," and "said" are intended to mean that there are one or more of the elements, unless otherwise indicated. Moreover, the term "and/or" includes any and all combinations of one or more of the associated listed items. The terms "comprising," "including," and "having" are intended to be inclusive, and mean that there may be additional elements other than the listed elements. Approximating language, as used herein throughout the specification and claims, may be applied to modify any quantitative representation that could permissibly vary without resulting in a change in the basic function to which it is related. Accordingly, a value modified by a term or terms, such as "about" or "substantially", is not to be limited to the precise value specified. In some instances, the approximating language may correspond to the precision of an instrument for measuring the value.

Figure 1:
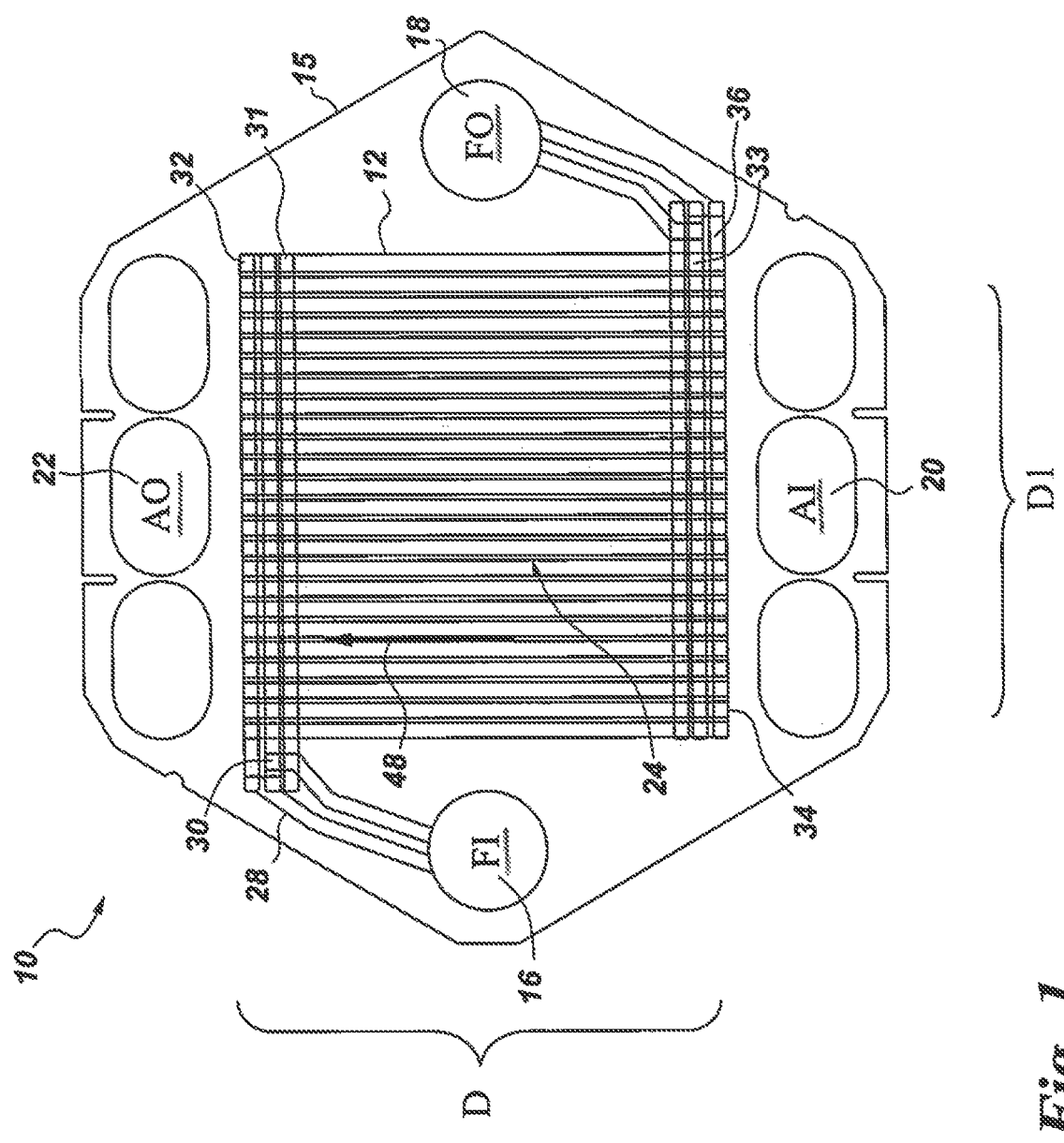
FIG. 1 is a schematic of a portion of a fuel cell interconnect structure, showing a fuel flow field for embodiments of this invention.

A portion of an interconnect 10 for embodiments of this invention is illustrated in FIGS. 1 and 2. For viewing simplicity, anode interconnect structure 12 is shown, side-by-side, with cathode interconnect structure 14. (For brevity, the structures are sometimes referred to herein as the "anode interconnect" and the "cathode interconnect", respectively). In practice, the anode is integrated with the cathode interconnect. Typically, cathode interconnect 14 is disposed over anode interconnect 12, and attached thereto, forming a rigid plate that incorporates anode gas and cathode air passages in a selected pattern. (Other intervening plate structures are usually disposed between structures 12 and 14, as further described below).

In some embodiments, the anode interconnect and cathode interconnect are substantially planar plates. The plates depicted in the drawings are hexagonal-shaped across the plane, but they could be any shape that is appropriate for a given manufacturing and operation scenario for the fuel cell. (As also described below, the active region within each plate is often substantially square-shaped). The perimeter region of each active region includes seals that surround and seal the manifold openings, in a configuration sufficient to prevent air and fuel from contacting each other.

The interconnects are usually fabricated from an electrically conductive material, capable of operating at higher temperatures characteristic of SOFC's. Non-limiting examples include stainless steels, nickel, nickel alloys, FeCr alloys, nichrome, gold, silver, platinum, palladium, ruthenium, rhodium, or various combinations thereof. Stainless steel and related alloys are often preferred.

Anode interconnect 12 includes a fuel flow field 24. Cathode interconnect 14 includes an air flow field 26. As known in the art, the two flow fields collectively define a planar, active region of the cell. Each flow field is usually formed as a series of longitudinal, parallel passageways, e.g., corrugated channels. The channels are typically supplied by manifolds, and carry the appropriate medium (fuel or air), according to a routing configuration that allows for the fuel-air reaction to occur only at a specified time and location. As those skilled in the art understand, a large number of fuels for SOFC's can be used, such as methane and other light hydrocarbons. Heavier hydrocarbons—often externally reformed—can be used as well, such as gasoline, diesel fuel, jet fuel, or biofuels. The intake into an SOFC can also include carbon dioxide, carbon monoxide, water, and hydrogen.

Fuel flow field 24 and air flow field 26 can be aligned to provide parallel flow—either co-flow or counter-flow. Parallel flow in the case of SOFC's can be advantageous, potentially providing better cell performance, due in part to a more uniform distribution of heat within a given level of the fuel cell stack, i.e., more favorable thermal gradients across the surface of the various stack levels. In some instances, parallel co-flow is preferred for SOFC systems that include one or more external reforming systems. Parallel counter-flow is often preferred for internally-reformed SOFC systems.

As alluded to previously, interconnect 10 includes internal manifolds that route fuel to the anode chamber (described below) and air to the cathode chamber. As those skilled in the art understand, internal manifolds are self-contained reactant delivery systems located within the fuel cell casing 15. They require only connections to external reactant tanks or other external reactant sources to become operational.

With continued reference to FIG. 1 and particularly, the fuel flow field, manifold openings 16 and 18 are shown. Fuel inlet (FI) manifold 16 is positioned opposite fuel outlet (FO) manifold 18. Their specific position along each dimension "D" can be varied, but usually, they are relatively close to the respective mid-point of the dimension. Moreover, design configurations would also allow the illustrated positions of inlet manifold 16 and outlet manifold 18 to be reversed.

Air manifold openings 20 and 22 are also depicted in the figure. Air inlet (AI) manifold 20 is positioned opposite air outlet (AO) manifold 22. As in the case of the fuel manifold openings, the specific position of the air manifold openings along dimension "D1" can be varied, but usually, they are close to the dimension midpoint. The relative positions may be switched as well. Moreover, multiple air outlet manifolds and inlet manifolds may be used, generally parallel to each other. In FIGS. 1 and 2, central air manifolds 20 and 22 are depicted and labeled, but optional, adjacent manifold openings are also shown. The most appropriate number of manifolds will depend on many of the factors discussed herein, including the required amount and pattern of airflow through the interconnect.

The cross-flow orientation of the manifold openings depicted in FIG. 1 can be very advantageous. For example, manifolds aligned in this manner are relatively easy to manufacture and incorporate into a fuel stack cell. Furthermore, the cross-flow orientation often promotes better fluid flow distribution on the "air side" of the interconnect. Moreover, cross-flow can permit better sealing within the fuel cell. Those familiar with the art understand that the integrity of seals in high-temperature fuel cells like the SOFC's is one of the key parameters for maintaining the usable life of the device.

The configuration depicted in FIG. 1 comprises a fuel pathway 28 that extends from a generally-midpoint location at fuel inlet 16, to a corner region 30 of anode interconnect structure 12. From that location, the fuel is directed through one or more header channels 31 (which are usually below the surface of flow field 24). The fuel exiting the header channels is directed through suitable parallel passageways (i.e., flow channels), away from first interconnect border/side 32, toward the second border/side 34, opposite first side 32. The fuel pathway usually extends to, and through, one or more footer channels 33, also below the flow field surface. The fuel path then leads to a corner region 36, diagonally opposite corner region 30, across the plane of the interconnect structure, exiting at fuel manifold 18.

It should be clear from this description and FIG. 1 that the fuel flow field from the fuel inlet manifold 16 to the fuel outlet manifold 18 is sine-shaped, across the active region of the anode interconnect structure. FIG. 3 is a simplified illustration of the general direction of flow, from fuel inlet manifold 40 to fuel outlet manifold 42, across a planar interconnect 44, similar to that of FIG. 1. In practice, fuel flow 37 is spread through the various flow channels (not specifically shown in this figure) of the interconnect 44, in direction 46. The specific "sine-shape" can vary somewhat, as discussed in the Examples.

Referring back to FIGS. 1 and 2, airflow 48 is illustrated, flowing from inlet 20 to outlet 22. In this manner, the air flow is parallel to the fuel flow, in either a counter-flow (as depicted) or co-flow arrangement, even though the manifold openings are in a cross-flow orientation. As mentioned previously, the parallel flow provides some key advantages for SOFC operation, as does the cross-wise orientation of the manifold openings.

Figure 4:
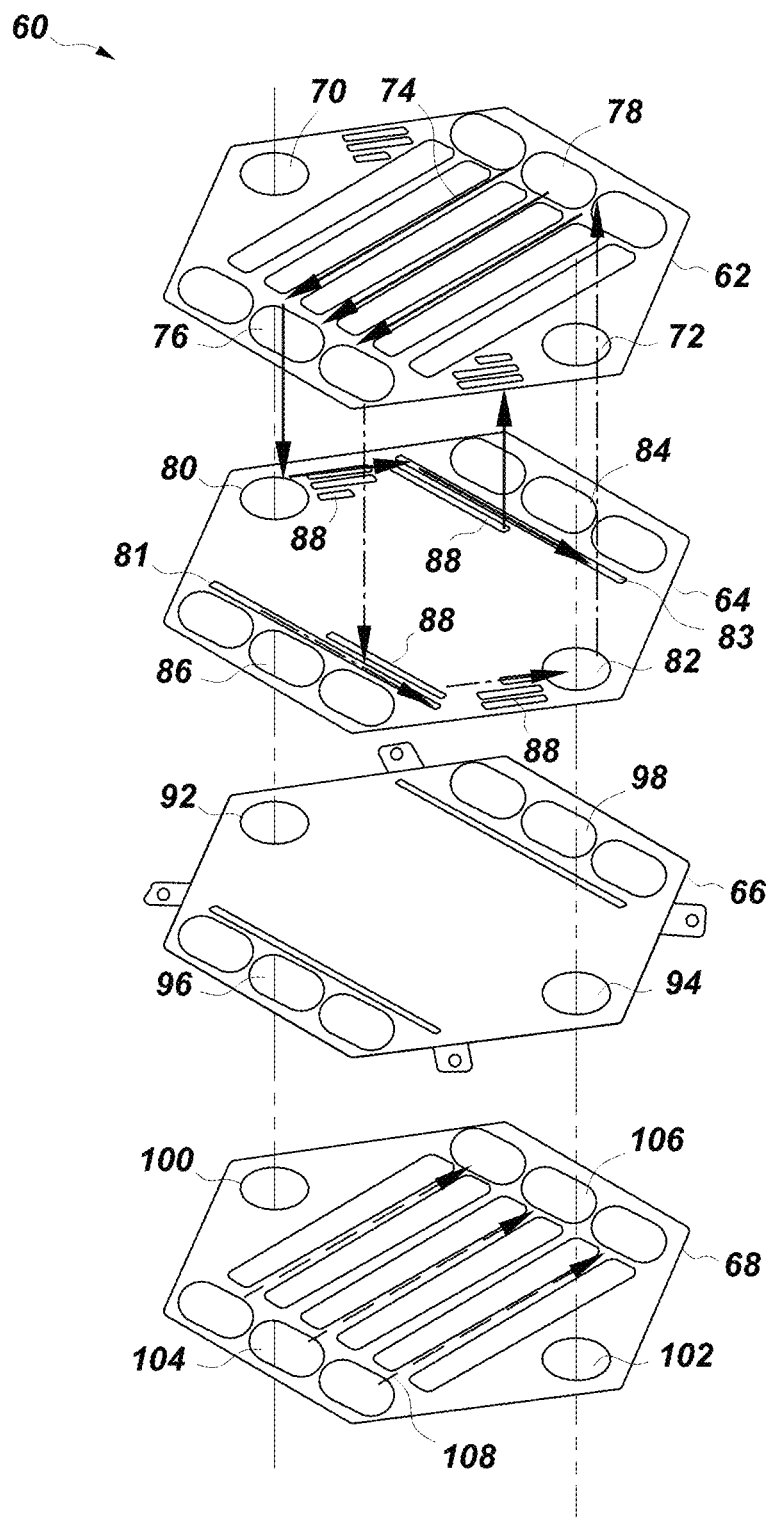
FIG. 4 is a schematic of a multi-layered interconnect structure, according to illustrative embodiments of this invention.

FIG. 4 represents a more specific embodiment for the invention, showing interconnect 60 and its components, in exploded form for ease-of-viewing. In this embodiment, four plates are attached in the exemplary sequence shown, i.e., anode interconnect structure 62 (fuel), manifold plate 64, separator plate 66, and cathode interconnect structure 68 (air). Fuel inlet manifold 70 is positioned opposite fuel outlet manifold 72, and their relative position along the dimension of flow path 74 can vary as well, as noted for the embodiment of FIG. 1. Air manifold openings 76 and 78 are also shown in the interconnect structure. Air inlet manifold 76 is positioned opposite air outlet manifold 78. (The number of flow channels shown in this figure is reduced, to simplify the intended representation).

Manifold plate 64 includes fuel manifold openings 80 and 82, which are vertically aligned with manifolds 70 and 72 of anode structure 62, respectively. Similarly, the air manifolds 84 and 86 on manifold plate 64 are vertically aligned with air manifold openings 78 and 76, respectively.

The manifold plate further includes a series of fuel routing pathways 88. They are formed in specific shape and orientation, to re-direct the pathway of fuel. The fuel entering through inlet manifold 70 is redirected from a direction that would otherwise be cross-wise, relative to the air pathway, to a direction that is parallel, relative to the air pathway (i.e., co-flow or counter-flow).

The various routing pathways 88 are geometrically designed to shuttle each fuel path so that fuel can be directed from the fuel manifold openings 80, 82 to the header and footer channels 81, 83, respectively. In this manner, the overall fuel path from the fuel inlet manifold to the fuel outlet manifold is sine-shaped, as depicted in FIG. 3. The routing pathways can be formed within the depth of the manifold plate by various metal forming techniques, such as punching, stamping, rolling, indenting, forging, and dieforming. The most appropriate configuration for the routing pathways 88 can be determined by a variety of actual flow tests and software-based flow models, without undue effort.

Interconnect 60 may include one or more separator plates 66. In addition to providing electrical connection between the various levels of the interconnect, each separator plate also physically separates oxygen flow and fuel flow, which is a critical requirement for all fuel cells. The separator plate can also help to stiffen the interconnect and enhance its physical integrity.

In most embodiments, separator plate 66 does not function to alter the direction of fuel flow, as in the case of manifold plate 64. The separator simply allows the passage of fuel and air through openings that are aligned with openings in the other parallel plates of the interconnect. For example, the separator includes fuel manifold openings 92 and 94, which are vertically aligned with manifolds 80 and 82 of manifold plate 64, respectively. Similarly, the air manifolds 96 and 98 are vertically aligned with air manifold openings 86 and 84, respectively, of manifold plate 64.

Cathode interconnect structure 68 is disposed below the separator plate, and includes manifold openings that are aligned with the openings in the other plates of the interconnect. Thus, fuel manifold openings 100 and 102 are vertically aligned with manifolds 92 and 94, respectively. Air manifold openings 104 and 106 are aligned with openings 96 and 98, respectively. The operation of the cathode interconnect is as described previously. The incorporation of manifold plate 64 into the overall structure effectively results in air flow path 108 being parallel to fuel flow path 74, even when the fuel manifolds of the anode interconnect are arranged in the cross-flow orientation. While FIG. 4 depicts a counter-flow arrangement, a variation in the relative positions of the manifolds at each plate level would enable the co-flow orientation of fuel and air.

With continued reference to FIG. 4, the four plates 62, 64, 66 and 68 can be attached to each other by conventional techniques. Non-limiting examples include mechanical means such as bolting or clamping, or other techniques, such as brazing, welding, or bonding with adhesives. Moreover, a number of variations are contemplated in regard to the embodiments of FIG. 4. For example, the components in the interconnect could be reversed in position. Anode interconnect 62 could be located at the base of the interconnect, while cathode interconnect 68 could be located at the top of the interconnect, with the proviso that the manifold plate remains adjacent to the anode interconnect.

Moreover, while four separate and distinct plates are shown in FIG. 4, other arrangements are also possible. For example, anode interconnect 62 and manifold plate 64 could be formed as one piece, assuming the location of the various fuel routing pathways 88 has been established beforehand. Various machining techniques (as set out previously) could be used to form such a piece, possibly in conjunction with metal-etching operations. In fact, separator plate 66 could also be formed as part of the combined structure of plates 62 and 64. Alternatively, separator plate 66 could be formed as one piece with cathode interconnect structure 68, through similar types of fabrication techniques. Similar structures could also be fabricated by stamping or coining techniques, or by 3-D printing, for example.

The interconnect described herein is most often a component of an SOFC stack, attached on one end or the other of a cathode-electrode-anode structure. The physical and electrical arrangement of such an SOFC stack is known in the art. Non-limiting descriptions of these fuel cell stacks can be found in many references, such as "Recent Advances in Metallic Interconnects for Solid Oxide Fuel Cells", Z. Yang, International Materials Reviews, 53:1, 39054, DOI (2008); and U.S. Pat. No. 6,824,910 (Chung et al), both of which are incorporated herein by reference.

Those skilled in the art understand that there can be many additional components associated with the SOFC stack, such as current collectors, additional separator plates, sealing and insulation systems, heat exchangers, system control processors, fuel- and air-storage tanks, compression mechanisms, dielectric isolation systems, and the like. The cells within an SOFC stack may be connected in series to raise the voltage potential of the stack. Moreover, an SOFC stack may be connected in parallel with other stacks to increase the current-generating capability of the device. In some instances, a stack of fuel cells may comprise about ten cells or less, while in other cases, several hundred cells may be attached together within a stack.

Another embodiment of this invention relates to a power generation system. The system includes at least one SOFC stack that includes the interconnect described herein. A variety of power generation systems having an SOFC stack connected to any type of power block (such as a gas turbine, steam turbine, combustion engine, or additional fuel cell) fall within the scope of this invention. Non-limiting examples of the SOFC-power systems are described in U.S. Patent Publications 2012/0251898 A1 (M. Lehar et al; filed Mar. 31, 2011); 2012/0251899 A1 (M. Lehar et al; filed Mar. 31, 2011); and 2013/0260268 A1 (Shapiro et al, filed May 31, 2013), all of which are incorporated herein by reference.

In some embodiments, the SOFC stack (referred here for simplicity as the "fuel cell") includes an anode configured to generate a tail gas, and is attached, directly or indirectly, to a hydrocarbon fuel reforming system. The reforming system is configured to mix a hydrocarbon fuel with the fuel cell tail gas, downstream of the fuel cell. In this manner, at least a portion of the hydrocarbon fuel and the fuel tail gas is converted to a reformed fuel stream that includes carbon dioxide ($CO_2$). In turn, at least a portion of the reformed fuel stream can be channeled back to an inlet of the fuel cell, as described in Publication 2012/0251898. All or part of the remaining reformed fuel stream can be removed from the system and directed to another site, e.g., a $CO_2$ removal system (which can also be attached to the overall fuel cell-power system).

The fuel cell-power generation system described above usually includes at least one power block set forth above, such as a turbine or combustion engine, e.g., an internal combustion engine. The turbine or engine can be referred to as a "bottoming cycle", that can be fueled, at least partially, by another portion of the reformed fuel stream discussed previously. The combustion engine or other power device can in turn be coupled to an electric power generator or other load, such as a pump or compressor. Residual heat from the power device can also be circulated and re-used as another "operational loop", as described in Publication 2013/0260268, for example. As those skilled in the art understand, this type of system is considered to be a combined cycle power plant that includes electricity being produced by the fuel cell, and mechanical work and/or additional electricity being produced by the power block and other attached units. Clearly, a key component of such a system is a fuel cell, such as a high-temperature SOFC. Thus, the enhancement of interconnect structures within the fuel cell to increase cell performance, as described herein, also improves the efficiency of the overall fuel cell-power system.

Yet another embodiment of the invention relates to a method for providing parallel flow of air and fuel across a planar interconnect surface for an internally-manifolded SOFC stack in which fuel manifold openings on the interconnect surface are arranged in cross-flow orientation. As described above, there are considerable advantages to providing parallel flow of air and fuel (e.g., counter-flow), while maintaining the fuel manifold openings in a cross-flow orientation. This method includes the step of directing the flow of fuel through fuel-routing pathways in a manifold plate structure interposed between an anode interconnect and a cathode interconnect. (As noted above, the overall structure can also include at least one separator plate). As also described previously, the fuel-routing pathways of the manifold plate structure are configured to re-direct or "switch" the direction of flow from a cross-flow orientation to a parallel flow orientation, relative to the flow of air across the planar interconnect surface.

Examples

The performance of various fuel-flow configurations for SOFC interconnect configurations discussed above was evaluated, using CFX/Ansys® modelling software. A typical fuel composition was used for the model, containing methane, carbon monoxide, carbon dioxide, and water. Moreover, a configuration similar to that of FIGS. 1 and 4 was projected in the model, with fuel entering from an outside source, into and across a header channel, down a series of flow channels in the active area, and then to an exit site. As discussed below, the model included samples for parallel flow, with manifolds oriented according to this invention, along with a cross-flow configuration, for comparison.

Figure 5:
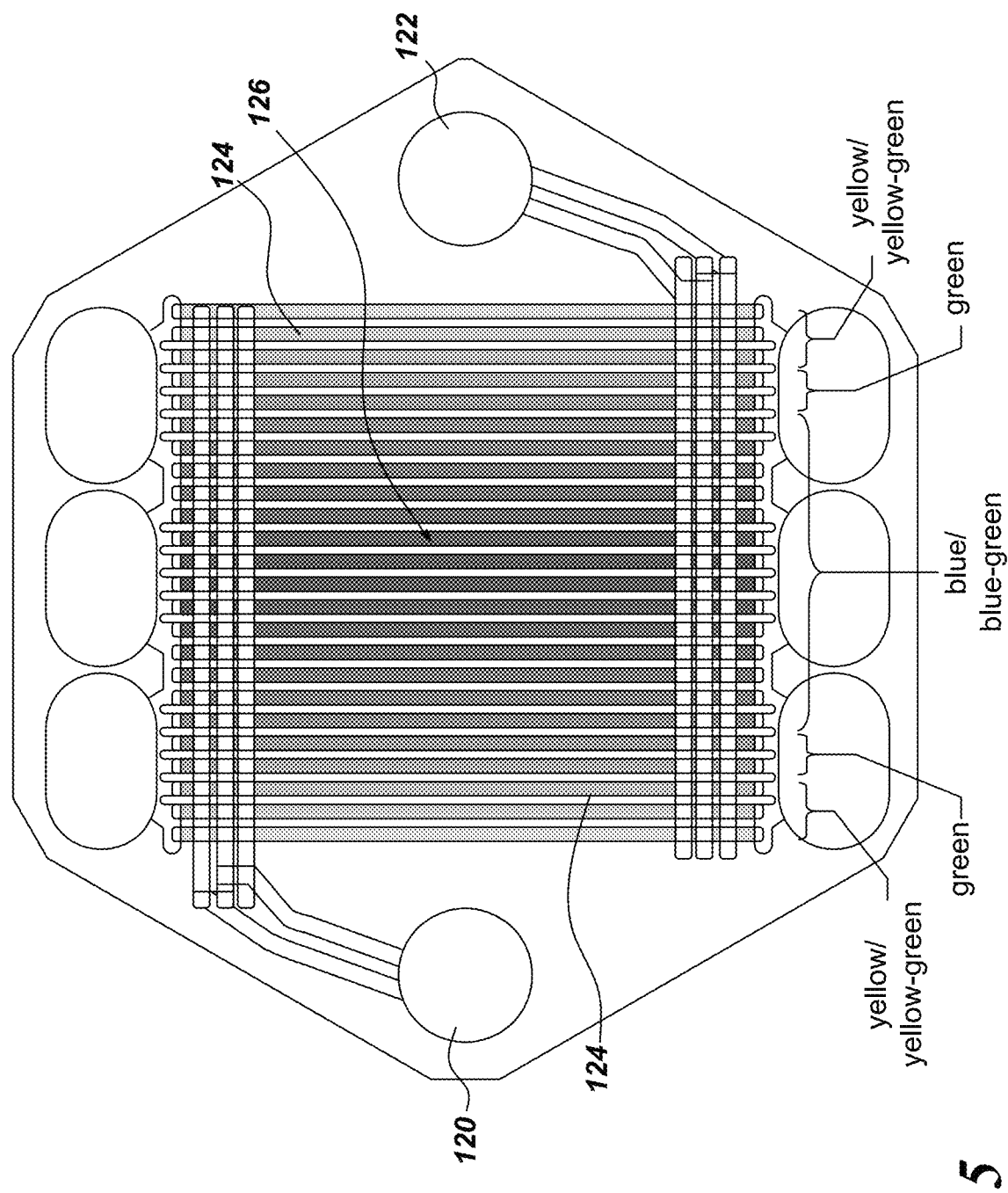
FIG. 5 is a depiction of an anode interconnect structure for an SOFC, used for modelling a fuel flow path according to this invention.

FIG. 5, also designated as "Case 0", represents one configuration according to this invention. Fuel manifolds 120, 122, are positioned opposite each other, and a projected set of 24 parallel flow channels 124 are shown, across the flow field 126, allowing for the flow of fuel in a top-to-bottom direction, according to the two-dimensional depiction. In the original modelling exercise, a color code was used, with different colors representing the velocity of fuel flow. The closer the registered colors were for the flow channels (i.e., from channel to channel), the more uniform was the fuel flow. In general, more uniform fuel flow is very desirable, as explained herein.

In the case of FIG. 5, the flow channels were generally quite close in color, in the central region of the flow channel, i.e., within a width of about 12 channels, with an average velocity of about 0.6-0.8 $ms^{-1}$ (designated as blue/blue-green). For the next three, outward channels on each side, the color-shading showed some change, with an average velocity of about 0.8-1.2 $ms^{-1}$ (designated as green). The color-change was more noticeable for the most outward channels (yellow/yellow-green), i.e., approximately the last three on each side, with an average velocity of about 1.2-1.7 ms$^{-1}$. Thus, while the color-change does indicate a degree of non-uniformity in flow, the overall amount of uniformity is sufficient for most embodiments of this invention.

Figure 6:
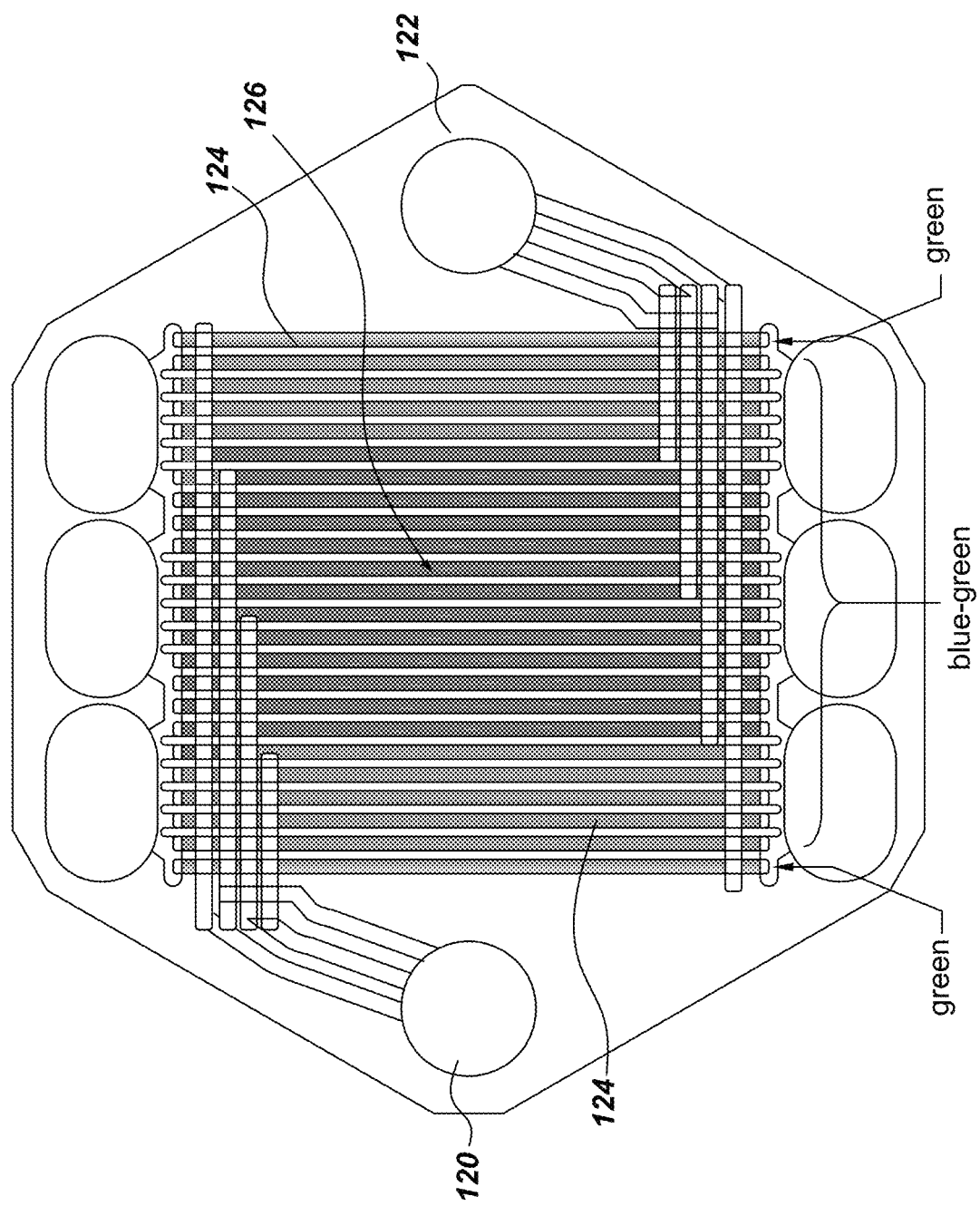
FIG. 6 is a depiction of another anode interconnect structure for an SOFC, used for modelling a fuel flow path according to this invention.

FIG. 6, also designated as "Case 7", represents another configuration according to this invention. While the fuel manifolds and flow channel design were the same as for the model of FIG. 5, the particular configuration (as modelled) of the underlying routing pathways (not shown) was adjusted to some degree. This resulted in a somewhat better balance in terms of fuel flow, as compared to FIG. 6, and as demonstrated by greater uniformity in color, from channel-to-channel (blue-green for most channels, with green at several outermost channels). The average velocity across the channels was about 0.8-1.2 ms$^{-1}$.

Figure 7:
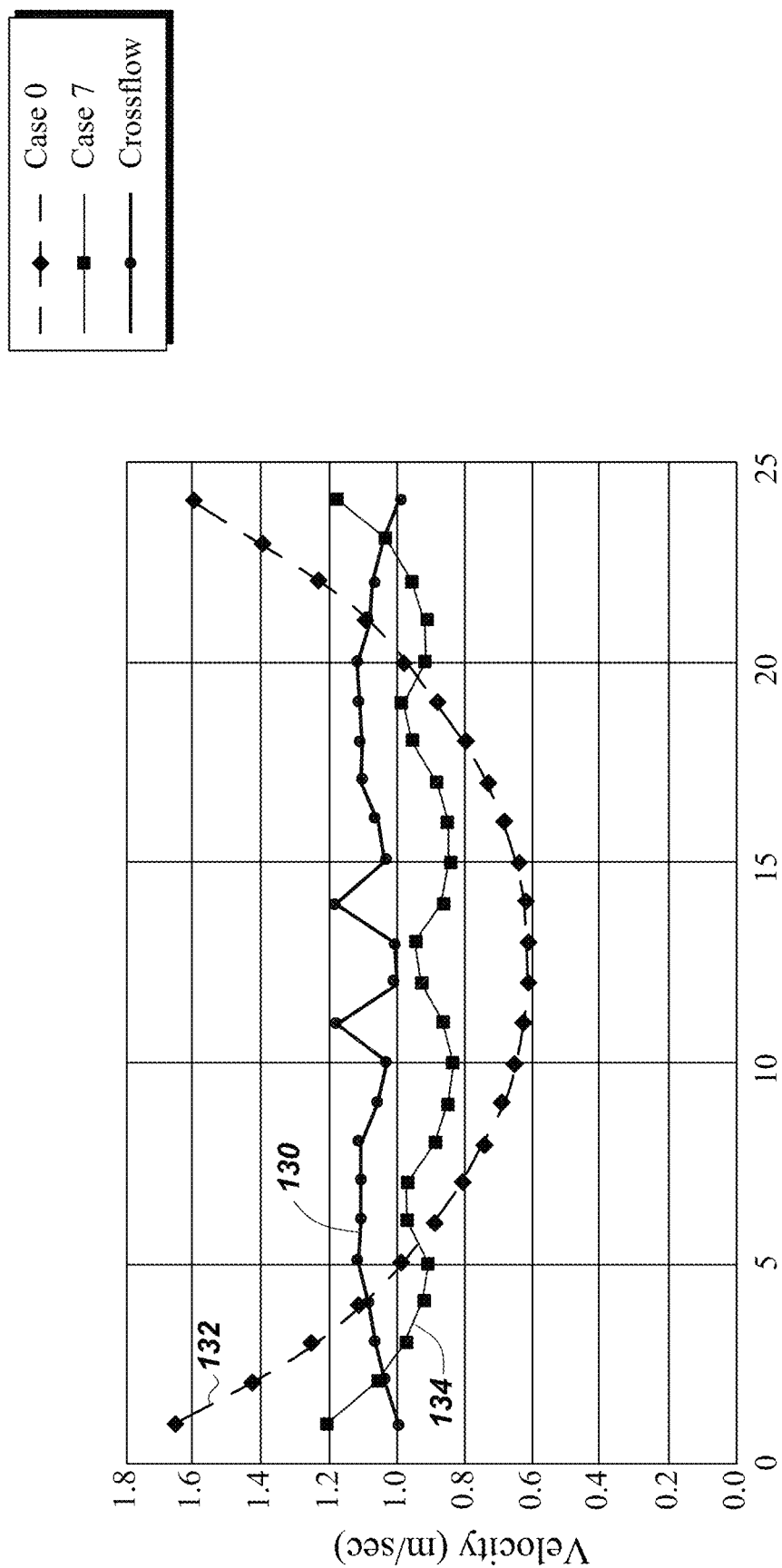
FIG. 7 is a fuel velocity variation graph, based on the series of flow channel models exemplified by FIGS. 5 and 6.

FIG. 7 is a fuel velocity variation graph, based on the series of flow channel models exemplified by FIGS. 5 and 6. In FIG. 7, fuel flow velocity is plotted as a function of channel number, i.e., the channel position across a set of flow channels in a flow field, as depicted in the previous figures. Flow curve 130 represents the fuel velocity variation for a cross-flow configuration outside of the present invention. In general, the fuel flow is well-balanced and uniform.

With continued reference to FIG. 7, flow curve 132 represents the fuel velocity variation for Case 0 (FIG. 5), described previously. In this instance, flow uniformity is not optimized, and the curve shows greater variation than flow curve 130. Flow curve 134 represents Case 7 (FIG. 6), also described above. The fuel flow is more uniform than that of Case 0, although not as uniform as the flow associated with cross-flow curve 130. As noted above, however, both Case 0 and Case 7 represent fuel flow patterns that would be quite acceptable for various SOFC interconnect structures described herein. Moreover, it is believed that additional variation in the flow configuration, e.g., with the routing channels described above, would further optimize fuel flow patterns and characteristics according to this invention.

Additional modelling was carried out, in which the configuration of the routing pathways was further varied. In some instances, projections were also made for situations in which some of the channels were blocked off, e.g., blocked along the horizontal header channels. Generally, it should be understood that fuel flow uniformity, while an important factor, needs to be balanced with other factors that affect fuel cell performance. For example, in some cases where modelling called for a group of the flow channels to be blocked off or shortened in length, greater flow uniformity was evident, i.e., better flow balancing than in Case 7. However, the decreased size of the overall flow field provides less area to effectively make power in the fuel cell reaction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. An interconnect for an internally-manifolded solid oxide fuel cell (SOFC) stack, the interconnect comprising:
   at least one anode interconnect structure integrated with and adjacent to a cathode interconnect structure,
   wherein the anode interconnect structure includes a fuel flow field; and
   the cathode interconnect structure includes an air flow field; and
   the anode interconnect structure and the cathode interconnect structure are configured to allow for parallel flow of air and fuel across a plane of the interconnect; and
   wherein manifold openings for both the anode interconnect structure and the cathode interconnect structure are arranged in a crossflow orientation,
   wherein at least one separator plate capable of preventing the contact of fuel and air is disposed between the anode interconnect structure and the cathode interconnect structure,
   wherein a manifold plate structure is situated between the separator plate and the anode interconnect structure, the manifold plate structure comprising a pattern of pre-selected fuel-routing pathways configured to redirect the flow of fuel, which is entering through the anode interconnect manifold openings, such that the flow of fuel is redirected relative to the flow of air, which is entering through the cathode interconnect manifold openings, from the crossflow direction to a counter-flow direction across the plane of the interconnect in a region between the manifold openings.

2. The interconnect of claim 1, wherein the adjacent anode- and cathode interconnect structures are each substantially planar plates attached to each other to form the interconnect.

3. The interconnect of claim 2, including a first surface and a second surface opposite the first surface, wherein each of said surfaces comprises longitudinal flow passageways which function as the respective fuel flow field and air flow field.

4. The interconnect of claim 3, wherein the fuel flow field and the air flow field collectively define a planar, active region of the fuel cell.

5. The interconnect of claim 4, wherein the planar active region of the fuel cell is generally square-shaped across the plane; and the manifold openings are situated adjacent four sides of the generally square-shaped planar active region; such that at least one air intake manifold adjacent to one side opposes at least one air output manifold adjacent to an opposite side; and
   at least one fuel intake manifold adjacent to one side opposes at least one fuel output manifold adjacent to an opposite side.

6. The interconnect of claim 5, wherein the fuel flow field from the fuel intake manifold to the fuel output manifold is sine-shaped across the planar active region.

7. An SOFC fuel cell stack comprising a plurality of solid oxide fuel cells juxtaposed to one another; wherein at least one interconnect according to claim 1 is disposed between each SOFC cell, said interconnect providing an electrical interconnection between at least two adjacent cells.

8. The SOFC fuel cell stack of claim 7, wherein the manifold openings for each anode interconnect structure and each cathode interconnect structure are vertically aligned to the manifold openings in every other respective anode and cathode interconnect structure of the fuel cell stack.

* * * * *